Aug. 7, 1934.  F. G. CURTIN  1,969,640
FLUSHING VALVE
Filed Jan. 6, 1933
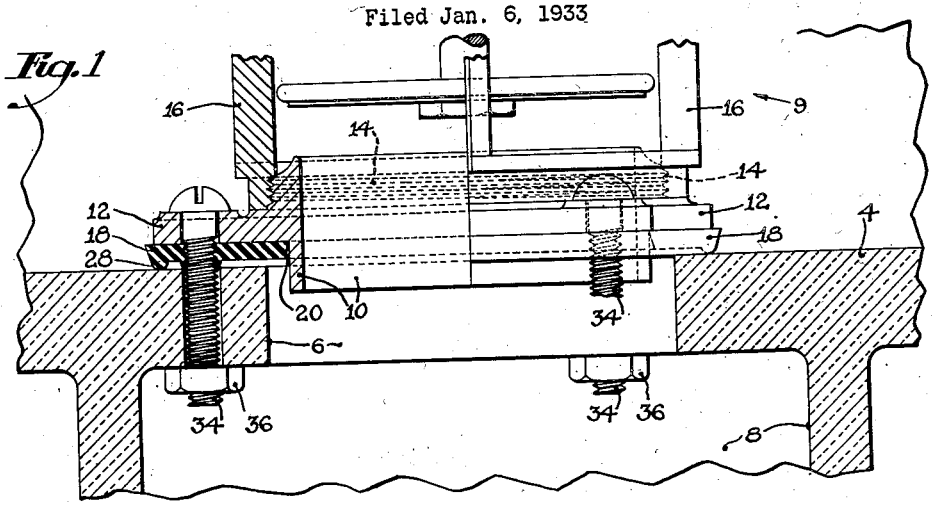
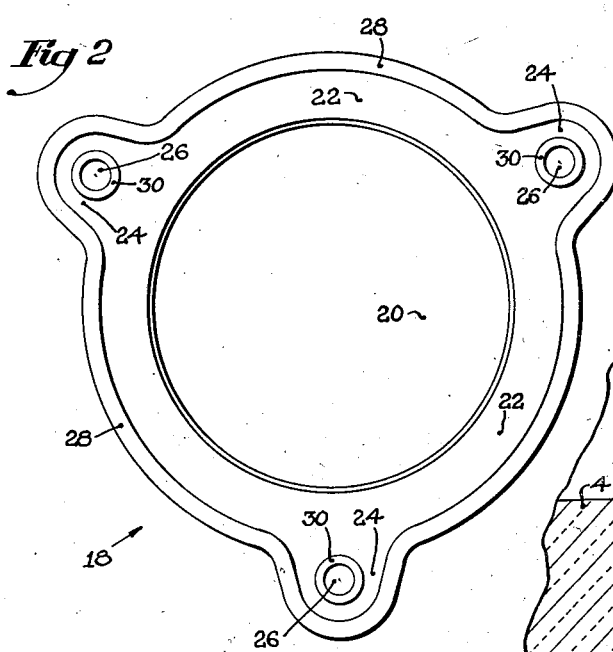
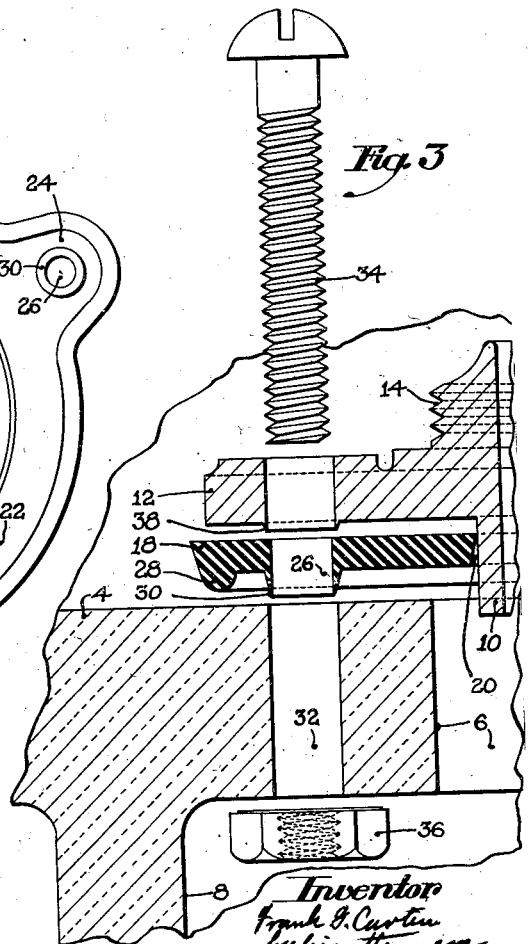

Patented Aug. 7, 1934

1,969,640

UNITED STATES PATENT OFFICE 1,969,640

FLUSHING VALVE

Frank G. Curtin, Medford, Mass.

Application January 6, 1933, Serial No. 650,491

1 Claim. (Cl. 4—52)

The present invention relates to flushing valves for water closets and more particularly to valve mounting means and gaskets therefore.

The object of the present invention is to provide a gasket associated with the flushing valve which will permanently seal against leakage of water from the tank. To this end, the present invention comprises the apparatus hereinafter described and particularly defined in the claim.

In the accompanying drawing illustrating the preferred form of the invention, Fig. 1 is a fragmentary sectional view of the tank with the valve mounted therein; Fig. 2 is a plan view of the gasket; and Fig. 3 is a sectional detail view on an enlarged scale showing the mode of attachment of the valve to the tank.

In Fig. 1, the tank is illustrated as having a floor 4 with a circular outlet opening 6, and an outlet passage 8. The outlet passage is preferably cast integrally with the tank.

Seated in the opening 6 is a valve indicated generally at 9, which is of the general construction shown in the Curtin Patent No. 1,536,078. The valve comprises a sleeve member 10 which extends through the opening 6 and which is provided above the floor with a bolting flange 12. At its upper end, the sleeve is threaded as indicated at 14 to receive a cage 16 which encloses the valve disk and supports the float.

Interposed between the bolting flange 12 and the floor 4, is a gasket 18 of soft rubber. The gasket has a central opening 20 within which the sleeve 10 is received and an annular rim portion 22 conforming to the shape of the bolting flange 12. As shown in Fig. 2, the rim 22 is provided with projecting portions 24, each having a bolt hole 26. Completely surrounding the rim is a bead 28 which is adapted to engage and be pressed firmly against the floor of the tank. Around each bolt hole is a tapered annular lip 30.

The parts are assembled as shown in Fig. 3, the gasket being placed upon the floor with the bolt holes 26 in register wtih openings 32 in the floor. The bolting flange 12 of the valve is mounted above the gasket. Bolts 34 are passed through the bolt holes and are secured by nuts 36 which are disposed internally of the passage 8. The opening 6 is sufficiently large to permit the plumber to hold the nut by the fingers while tightening the bolt 34 by means of a screw driver.

When the bolts 34 are tight, the bead 28 is compressed firmly against the floor of the tank. At the same time, the annular projections 30 around the bolt holes of the gasket are compressed by their engagement within the holes 32 of the tank and are accordingly forced into the screw threads, thereby effectively sealing against any leakage around the bolts. The bottom face of the bolting flange 12 is preferably formed with sharp annular lips which press into the soft rubber of the gasket and thereby assure further protection against leakage. In practice, these lips 38 are formed as burrs in the drilling of the bolt holes.

Although it has heretofore not been considered feasible to use rubber gaskets in conjunction with copper or brass plumbing fixtures because of corrosion in the presence of sulphur in the rubber, this objection is not present in this invention. The broad upper face of the gasket against the lower face of the bolting flange affords an effective seal which renders any corrosion inconsequential. Those portions of the gasket, such as the bead 28 and the lip 30 which are of relatively small dimensions, are in contact only with the porcelain of the tank and are not subject to any corrosive action.

Having thus described the invention, what is claimed is:

In a water closet tank having a floor with an outlet opening, a valve body on the floor and having a bolting flange surrounding the opening, a rubber gasket between the flange and the floor having a bead around the periphery to engage the floor and having a plurality of holes, an annular projection surrounding each hole, and bolts for securing the valve body and gasket to the floor, the bolting flange having bolt holes and a sharp annular lip surrounding each bolt hole to press into the gasket.

FRANK G. CURTIN.